J. C. PROEBSTEL.
HARNESS CHAIN.
APPLICATION FILED OCT. 7, 1915.

1,208,651.

Patented Dec. 12, 1916.

Witnesses:

Julius C. Proebstel
Inventor,
By
Atty.

UNITED STATES PATENT OFFICE.

JULIUS C. PROEBSTEL, OF PORTLAND, OREGON.

HARNESS-CHAIN.

1,208,651.   Specification of Letters Patent.   Patented Dec. 12, 1916.

Application filed October 7, 1915. Serial No. 54,550.

*To all whom it may concern:*

Be it known that I, JULIUS C. PROEBSTEL, a citizen of the United States, residing in the city of Portland, county of Multnomah, and State of Oregon, have invented certain new and useful Improvements in Harness-Chains, of which the following is a specification.

My invention relates to improvements in harness chains, and more particularly to a specially constructed chain adapted to be secured to a backing strip of flexible material, such as leather, rubber or other tough fabric, used in the manufacture of harness, my chain being particularly adapted to reinforce such material without destroying its flexibility, and to make possible a very strong structure, particularly adapted for use as harness tugs or traces.

Another object of my invention is to provide a chain which will not only permit of flexibility and withstand great strain, but to provide a chain which can be manufactured at a minimum cost. In order to do this, it is necessary to avoid too many mechanical operations in the manufacture thereof, and to avoid any welding.

I have provided a chain composed of two kinds of links, one of which is stamped or struck out of sheet metal, and the other of which is made of flat strip material, such as flat wire, having its ends folded upon each other with a single rivet through its middle and end portions, the same rivet securing the chain to the backing strip.

In order that others may fully understand my invention, I have illustrated the same in the accompanying sheet of drawings, which I will now describe.

Figure 1:
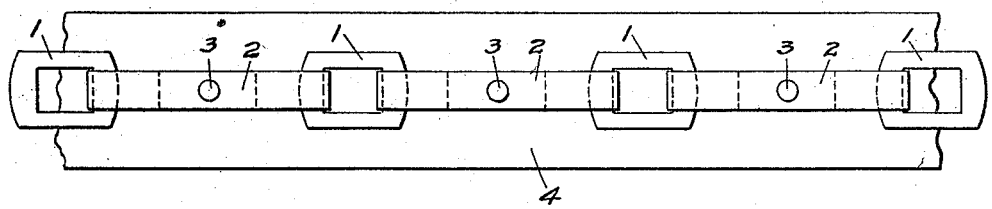
Figure 2:
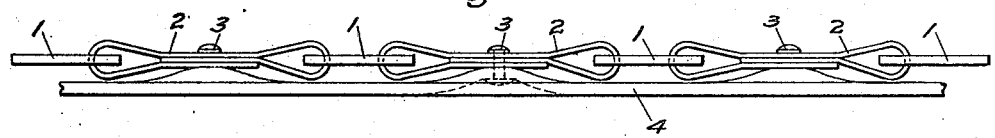
Figure 3:
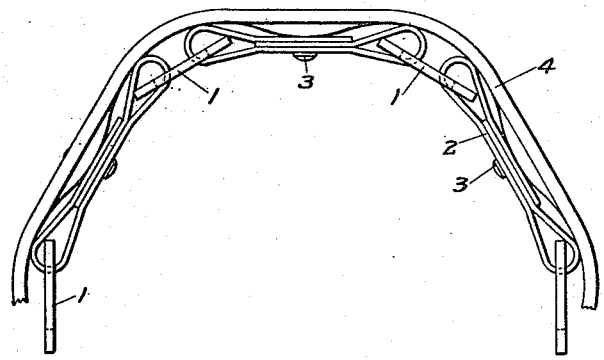

Figure 1 is a face view of a structure embodying my invention; Fig. 2 is an edge view thereof; and Fig. 3 is an edge view thereof, showing the action of the links to permit of flexibility in the structure.

Referring now more in detail to the drawings 1, 1, 1, 1, designates substantially square links struck out of sheet metal; 2, 2, 2, 2, designates connecting links made of strip metal, such as flat wire, having its ends folded over each other over the middle for substantially a third of the length of the link, the middle portions and both ends of each link being punched to receive a rivet 3, which also passes through a backing strip of flexible material 4, which may be of leather, rubber covered canvas, or other suitable material.

The links 2, are folded into open loops and are not struck down flat or closed upon the links 1, said loops being of a transverse diameter equal to the breadth of that portion of the link 1 inserted therein. This open loop makes possible the adjustment of the links 1 therein and permits the structure to be folded or unrolled, as clearly indicated in Fig. 3. This could not be possible if the loops were struck down flat upon the links 1. The three-ply middle portions of the links 2, give increased strength to this portion of the link, and thereby insures that the same will not be bent when stepped upon by the horse, as is so frequently the case.

In manufacturing the chain, the strips from which the links 2 are made, are cut in the right lengths and punched in the three places at one stroke of the machine. The ends are folded over upon each other and upon the middle portion of the strip and with a guiding prong through the three holes, the middle portion of the link is struck into the form indicated, so that the folds or laps lie flat together with the holes in register to receive the rivet, the rivet being placed through the backing strip 4 and through the link and riveted by machinery, thus making possible a very quick and economical method of manufacturing the article.

The backing strip holds the links in fixed relationship to each other, thereby preventing any lateral movement of the links relative to each other, while at the same time the construction of the links 2, permit the structure to be rolled, as indicated in Fig. 3, and makes a very flexible, yet a very strong harness trace at a minimum expense. If the loops of the links 2, were flattened down upon the links 1, it will readily be seen that the chain becomes a very stiff structure, and, therefore, a very objectionable and unsalable article.

What I claim and desire to protect by Letters Patent is,—

1. A chain of the character shown and described consisting of a series of links, each link being made of a flat strip of metal having its ends folded over upon its middle portion in such a way as to form elongated end loops extending longitudinally of said link, a fastener passing through the middle and end portions of said link, and other flat links connecting the loops of adjacent first links, said flat links having free movement in said loops lengthwise thereof, whereby to make possible the folding of said chain, substantially as described.

2. A trace consisting of a backing strip of flexible material, a series of links riveted thereto, each link consisting of a flat strip of metal having its ends folded over upon its middle portion thus forming end loops, a fastener passing through said backing strip and the middle and end portions of said link, and other links, connecting the loops of adjacent first links, said other links having free movement in said loops lengthwise thereof, substantially as illustrated.

Signed at Portland, Multnomah county, Oregon, this 1st day of October, 1915.

JULIUS C. PROEBSTEL.

Witnesses:
I. M. GRIFFIN,
J. C. STRENG.

Copies of this patent may be obtained for five cents each, by addressing the "Commissioner of Patents, Washington, D. C."